3,654,088
METHOD OF PRODUCING AMYLO-1,6-GLUCOSIDASE
Lowell E. Coker and Almerin W. Turner, Decatur, Ill., assignors to A. E. Staley Manufacturing Company, Decatur, Ill.
No Drawing. Filed Oct. 22, 1969, Ser. No. 868,572
Int. Cl. C12d *13/10*
U.S. Cl. 195—65                                           4 Claims

ABSTRACT OF THE DISCLOSURE

Method of utilizing amylopectin as the principal carbohydrate source for the production of amylo-1,6-glucosidase, which comprises (1) conditioning cells of a culture capable of producing amylo-1,6-glucosidase in an aqueous medium comprising a carbohydrate inducer selected from the group consisting of maltose, maltotriose, pullulan and mixtures thereof, (2) bringing together in an aqueous medium the induced cells and pasted amylopectin and (3) incubating at pH 6.0 to 8.1 to produce amylo-1,6-glucosidase, wherein the amylopectin constitutes the principal carbohydrate source in step (3).

DISCLOSURE OF THE INVENTION

This invention relates to the production of amylo-1,6-glucosidase. More particularly, this invention relates to the use of amylopectin as the principal carbohydrate source in the product of amylo-1,6-glucosidase.

It is well known that millions of pounds of starch are converted each year into syrups and crystalline products by treatment with acids and/or enzymes. Due to the large quantities of enzymes or hydrolases employed in these processes, enzymes producers have developed various techniques for optimizing the yield of enzyme from cultures. Generally speaking, the starch hydrolases are produced by a two-stage process. In the first stage, usually called the "propagation stage," a small inoculum of culture is added to a suitable carbohydrate-protein source designed to encourage the propagation and growth of a large population of cells capable of producing the desired hydrolase without actually forming hydrolase. Cells resulting from the propagation of the inoculum are added to a second carbohydrate-protein source designed to produce an optimum concentration of the desired hydrolase. This stage is usually called the "production stage."

In the last ten years scientists have succeeded in isolating amylo-1,6-glucosidase from certain bacterial cultures. This enzyme, which is often called pullulanase, is capable of debranching starch. Prior to this invention, amylo-1,6-glucosidase has been prepared by growing a culture of the type isolated from a strain of *Aerobacter aerogenes* on a substrate comprising maltose, maltotriose or pullulan as a carbohydrate source. Due to the relatively high cost of these carbohydrate sources, commercialization of amylo-1,6-glucosidase has been hindered. It is generally recognized that maltose, maltotriose and pullulan are all inducers of the growth of amylo-1,6-glucosidase from the aforesaid culture. While it is generally recognized that amylo-1,6-glucosidase enzyme is capable of cleaving the branches of amylopectin, it is recognized that amylopectin is not a suitable inducer for the production of amylo-1,6-glucosidase.

The object of this invention is to provide a relatively inexpensive principal carbohydrate source for the production of amylo-1,6-glucosidase. Another object of this invention is to provide a method of utilizing amylopectin as a principal carbohydrate source for the production of amylo-1,6-glucosidase.

We have now found that is possible to employ amylopectin as the principal carbohydrate source in the production of amylo-1,6-glucosidase. Surprisingly, we have that amylo-1,6-glucosidase cultures, which are incapable of producing amylo-1,6-glucosidase on an amylopectin substrate, can be induced to produce amylo-1,6-glucosidase by conditioning cells of a culture capable of producing amylo-1,6-glucosidase with amylo-1,6-glucosidase inducer, such as maltose, maltotriose or pullulan, and bringing together the induced cells and pasted amylopectin. The induced cells can be added to a suitable substrate containing paste amylopectin or the amylo-1,6-glucosidase culture cells can be added to a suitable substrate containing a mixture of amylo-1,6-glucosidase inducer and a pasted amylopectin substrate. In either case, the amylopectin serves as the principal carbohydrate source in the production of amylo-1,6-glucosidase.

The amylo-1,6-glucosidase cultures used in this invention include any amylo-1,6-glucosidase preparation, such as those reported by Bender & Wallenfels in Biochemische Zeitschrift, vol. 334, pages 79–95 (1961). Other information covering the use and production of this enzyme can be found in Methods of Enzymology, vol. 8, pages 555–559 (1966) According to the above references, amylo-1,6-glucosidase can be readily obtained from the organism *Aerobacter aerogenes*. Certain strains of the organism, *Aerobacter aerogenes*, have been reported to be particularly good sources for obtaining this enzyme. For example, *Aerobacter aerogenes* (U–58), which is believed to be a direct descendant of the original strain isolated by Bender & Wallenfels, has been found to be a particularly good source of this enzyme. Various ultraviolet induced mutants of *Aerobacter aerogenes* (U–58) can also be use. Other reported strains of *Aerobacter aerogenes* which can be used include *Aerobacter aerogenes* ATCC 9621 and ATCC 15050.

Briefly, amylo-1,6-glucosidase is produced by mixing induced cells capable of producing amylo-1,6-glucosidase with pasted amylopectin in an aqueous medium. The induced cells can be added to a suitable substrate containing pasted amylopectin or the amylo-1,6-glucosidase cells can be added to a suitable substrate containing an amylo-1,6-glucosidase inducer and pasted amylopectin.

In somewhat greater detail, scrapings of a stock culture capable of producing amylo-1,6-glucosidase (*Aerobacter aerogenes*) are added to an aqueous nitrogen-carbohydrate substrate. The carbohydrate employed in this stage serves principally as a carbon source for cell propagation and can be an inducer, such as maltose, maltotriose and/or pullulan or a non-inducer, such as dextrose. The carbohydrate can be present in a concentration of 0.1 to 10% by weight of the aqueous substrate, preferably 0.4 to 2.5% by weight. If desired, mixtures of carbohydrates can be employed. Suitable nitrogen sources in this step are protein, ammonia or ammonium salts.

The cells are incubated in the "propagation stage" at a pH of about 5.0 to 8.5, preferably 5.8 to 8.0, at from about 5° C. to 45° C., preferably 20 to 35° C., for about 10 to 72 hours, preferably 12 to 24 hours, during which time the number of cells can increase 50,000 fold. If the pH or temperature varies from the above ranges, cell propagation stops or is severely retarded. If incubation is carried out for less than 10 hours, an insufficient population of cells is provided in the first stage. On the other hand, if cell propagation is carried out for more than 72 hours, there is a tendency for deterioration of the cells and lower yields of amylo-1,6-glucosidase.

If maltose, maltotriose or pullulan constitute the principal carbohydrate source during the propagation stage, part of the carbohydrate source is utilized to produce enzyme with consequent lower yields of cells capable of producing amylo-1,6-glucosidase. In this case, the propagation stage can be viewed as a combined propagation-induction stage. Maximum cell propagation takes place when dextrose is the sole or principal carbohydrate source, since no enzyme forms until after the dextrose is consumed and the cells are conditioned in a medium containing one or more of the inducers, namely maltose, maltotriose and/or pullulan. In this case, induction must be carried out prior to or simultaneously with the production stage.

When the cells are propagated in the presence of an inducing carbohydrate (maltose, maltotriose and/or pullulan) they can be mixed with an aqueous nitrogen (protein, ammonia or ammonium salts)-amylopectin substrate to produce amylo-1,6-glucosidase in the production stage. The amylopectin, which is employed in pasted form, can be obtained from any source, such as waxy maize starch, waxy milo starch, fractionated corn starch, fractionated potato starch, etc. The amylopectin can comprise from about 0.5 to 20% by weight of the substrate. If less than 0.5% by weight amylopectin is employed, there is insufficient carbohydrate for the production of large concentrations of amylo-1,6-glucosidase. On the other hand, if the amylopectin constitutes more than 20% by weight of the medium, the substrate is too viscous and enzyme production is reduced. Generally, the amylopectin must be degraded with acid or enzyme (alpha-amylase) to be used at above about 5% solids. The composition is incubated during the production stage at about 5 to 45° C., preferably 20 to 35° C., until the desired concentration of enzyme is produced. The substrate must be maintained at a pH of 6.0 to 8.1, preferably 6.1 to 7.9. Failure to operate within this pH range results in the stoppage of enzyme production and enzyme production is not resumed after adjusting the pH to the designated range. Generally, during this step, maximum enzyme production is encouraged by suitable aeration, preferably by sparging with an oxygen containing gas such as air.

In the preferred method of operation, wherein the cells are propagated in the absence of an inducer and in the presence of dextrose as the principal carbohydrate source, there is no enzyme formed during the propagation stage. When the cells are propagated in the absence of an inducer, the cells are induced to produce amylo-1,6-glucosidase by adding the cells to an aqueous nitrogen (protein, ammonia or ammonium salts) substrate containing an inducing carbohydrate (maltose, maltotriose or pullulan) in a concentration sufficient to induce the production of amylo-1,6-glucosidase and overcome the inhibiting effect of dextrose. In this case, the substrate should contain at least 0.4% by weight, preferably at least about 0.5% by weight maltose, maltotriose and/or pullulan in order to induce the production of amylo-1,6-glucosidase. The composition is then incubated at about 5 to 45° C., preferably 20 to 35° C., for 2 to 24 hours, preferably 4 to 8 hours, during which time a suitable number of cell divisions takes place. If incubation is carried out for more than 24 hours before addition to the production nitrogen-amylopectin substrate, the amylo-1,6-glucosidase cells formed in the induction medium start to deteriorate. The substrate should be maintained at a pH of 5.0 to 8.5, preferably 6.0 to 8.1, during induction. In order to produce enzyme, the pH must be maintained at pH 6.0 to 8.1, preferably 6.1 to 7.9. Failure to operate within this pH range results in the stoppage of enzyme production and enzyme production is not resumed merely by adjusting the pH to the designated range. After induction is complete, the cells are mixed with the pasted amylopectin-nitrogen substrate and incubated in the same way as the cells propagated in the presence of an inducing carbohydrate. If desired, the induction stage and production stage can be combined by adding pasted amylopectin to the induction medium after induction is complete. Alternatively, induction can be carried out in the presence of pasted amylopectin.

The amylo-1,6-glucosidase produced in the production phase can be isolated and/or purified by any means employed for isolating amylo-1,6-glucosidase prepared by other processes.

The examples following are merely illustrative and shoud not be construed as limiting the scope of the invention.

EXAMPLE I

Cells from a stock culture of *Aerobacter aerogenes* were loop-inoculated into 100 mls. of an aqueous pH 7.0 substrate containing 0.3% by weight Bacto-meat extract, 0.3% by weight Bacto-Peptone, 0.07% by weight sodium chloride, 0.07% $K_2HPO_4$ and 0.5% by weight dextrose. The cells were incubated on a rotary shaker at room temperature for about 16 hours forming a stationary phase population of approximately $5 \times 10^9$ cells per ml. At this point, the repressed cells were incapable of producing amylo-1,6-glucosidase and none of the enzyme could be detected in the medium.

Two milliliters of the dextrose repressed cells were transferred to each of 5 Delong culture flasks containing 100 mls. of an aquous pH 7.0 inducing substrate containing 0.3% by weight, Bacto-meat Extract, 0.3% by weight Bacto-Peptone, 0.07% by weight sodium chloride, 0.07% by weight $K_2HPO_4$ and 1% by weight maltose. This substrate, which was identical to the substrate employed in the first stage except that the dextrose was replaced with twice the concentration of maltose, contained $5 \times 10^7$ cells per ml. The entire population of dextrose repressed cells was induced simultaneously and incubated at room temperature on a rotary shaker for about six hours during which time approximately 4 to 5 cell divisions occurred yielding an induced population of about $1 \times 10^9$ cells per ml. At this point the fully induced cells were producing amylo-1,6-glucosidase.

Four hundred milliliters of the induced cells were transferred to a 12,000 ml. pH 6.4 aqueous production fermenter medium containing 360 grams pasted waxy maize starch, 1,450 mls. of corn steep liquor, 60 grams of dissolved ammonium acetate, 106 grams of dissolved sodium citrate, 139 mls. 50% aqueous KOH and 150 grams of dissolved potassium chloride. The production batch was aerated in the fermenter for about 47 hours at room temperature. The pH was maintained below 7.9 by adding 80% aqueous acetic acid incrementally after the pH reached 7.9. The amylo-1,6-glucosidase was isolated by precipitation with acetone.

EXAMPLE II

When Example I was repeated by replacing the dextrose in the first step with 0.5% by weight maltose, there was a lower yield of amylo-1,6-glucosidase.

EXAMPLE III

Example I was repeated with essentially the same results using *Aerobacter aerogenes* ATCC 9621 and ATCC 15050.

Since many embodiments of this invention may be made and since many changes may be made in the embodiments described, the foregoing is to be intepreted as illustrative only and the invention is defined by the claims appended hereafter.

What is claimed is:

1. The method of utilizing amylopectin as the principal carbohydrate source for the production of amylo-1,6-glucosidase from cells of a culture capable of producing amylo-1,6-glucosidase, which comprises the steps of: (1) inducing the cells to produce amylo-1,6-glucosidase with an aqueous medium comprising a carbohydrate inducer selected from the group consisting of maltose, maltotriose, pullulan and mixtures thereof, (2) bringing together the induced cells and pasted amylopectin in an aqueous substrate medium and (3) incubating the substrate medium at pH 6.0 to 8.1 to further produce amylo-1,6-glucosidase, wherein amylopectin constitutes the principal carbohydrate source in step (3).

2. The process of claim 1, wherein the carbohydrate inducer comprises maltose.

3. The process of claim 1, wherein the pasted amylopectin comprises 0.5% to 20% by weight of the aqueous medium in step (3).

4. The cells of claim 1, wherein the cells are propagated before step (1) in a medium containing dextrose as the principal carbohydrate source.

References Cited

UNITED STATES PATENTS 3,490,995  1/1970  Wallenfels et al. _____ 195—66

LIONEL M. SHAPIRO, Primary Examiner

UNITED STATES PATENT OFFICE
CERTIFICATE OF CORRECTION

Patent No. 3,654,088     Dated April 4, 1972

Inventor(s) Lowell E. Coker and Almerin W. Turner

It is certified that error appears in the above-identified patent and that said Letters Patent are hereby corrected as shown below:

Column 1, line 31, for "product of" read ---production of---
Column 2, line 3, for "have that" read ---have found that---
Column 2, line 12, for "paste" read ---pasted---
Column 4, line 6, for "shoud" read ---should---
Column 4, line 23, for "aquous" read ---aqueous---
Column 6, line 1, Claim 4, for "The cells of" read ---The process of---

Signed and sealed this 25th day of July 1972.

(SEAL)
Attest:

EDWARD M. FLETCHER, JR.
Attesting Officer

ROBERT GOTTSCHALK
Commissioner of Patents